Patented July 5, 1949

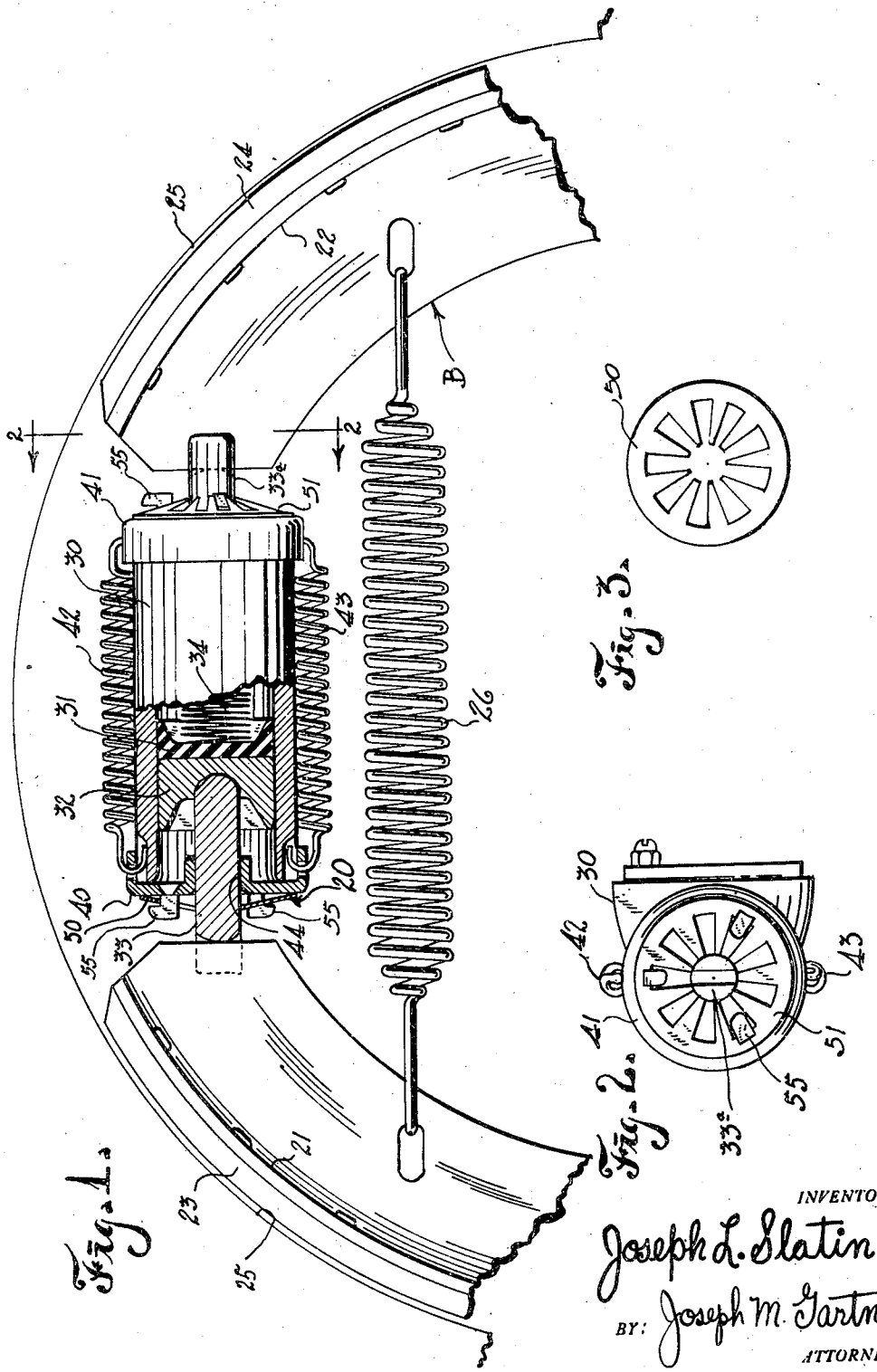

2,474,990

UNITED STATES PATENT OFFICE 2,474,990

SELF-ADJUSTING BRAKE

Joseph L. Slatin, Berwyn, Ill.

Application August 7, 1947, Serial No. 766,971

6 Claims. (Cl. 188—152)

This invention relates in general to brake mechanisms and is particularly concerned with such brake mechanisms adaptable to be employed in wheel brakes or to be incorporated in a transmission for an automotive vehicle, said brake mechanism being characterized as having means whereby such brake mechanism may be self-adjusting.

Heretofore, brake mechanisms of this general class consisted of a hydraulic cylinder having suitable pistons operatively disposed therein and operable upon actuation of a conventional brake pedal through a master hydraulic cylinder. No automatic means for adjusting the throw of the pistons was provided thereby necessitating frequent adjustment of the brake bands to compensate for normal wear. Moreover, when such brake mechanisms were adjunctively employed with transmission they are located in positions inconvenient for adjustment purposes.

Accordingly, an object and accomplishment of the invention is to provide a brake mechanism having incorporated therein, an automatic take-up for the brake bands, said takeup mechanism being adaptable to automatically compensate for the normal wear of the friction facing of the brake band.

Another object and accomplishment of the invention is to provide a braking mechanism having means whereby the hydraulic cylinder will operate after the full throw of the piston operatively disposed therein is reached, thereby providing a safety feature when brake bands have been worn down to capacity and the owner neglects to have the brakes relined.

The invention seeks, as a further object and accomplishment to provide an automatic take-up mechanism for brake bands as contemplated herein and characterized by an arrangement of parts to more advantageously and satisfactorily perform the function required of it and adapted to provide a compact unit which will successfully combine the factors of structural simplicity and durability, and yet be economical to manufacture.

Another object and accomplishment of the invention is to improve the construction of brake mechanisms by the incorporation therein of an automatic takeup for brake bands as contemplated herein, thereby to increase the efficiency and versatility of such brake mechanisms; and to this end, an important feature of the invention is to provide a brake mechanism comprising in general, conventional brake bands adaptable to be operatively associated with a suitable brake drum, said brake bands having operatively disposed therebetween a conventional hydraulic cylinder having operatively disposed therein a pair of pistons adaptable to operate in opposite directions thereby to force said brake bands into engagement with their associated brake drum, said pistons having associated therewith an automatic takeup mechanism adaptable to compensate for the normal wear of the friction facings of the brake band and comprising a choke spring associated with said hydraulic cylinder for adaptation to restrict return movement of a connector shaft of said piston subsequent to the releasing of the brakes.

Additional objects, features, and advantages of the invention disclosed herein will be apparent to persons skilled in the art after the construction and operation are understood from the within description.

It is preferred to accomplish the various objects of this invention and to practice the same in substantially the manner hereinafter fully described and as more particularly pointed out in the appended claims, reference being had to the accompanying drawing which forms a part of this specification, wherein:

Fig. 1 is a fragmentary sectional elevational view of the brake mechanism embodying the features of this invention and having portions broken away to more advantageously show the construction thereof;

Fig. 2 is an end elevational view of the brake mechanism depicted in Fig. 1 and taken substantially on the plane of the line 2—2 of Fig. 1; and Fig. 3 is an elevational view of the choke spring illustrated in assembly in Figs. 1 and 2.

The drawing is to be understood as being more or less of a schematic character for the purpose of illustrating and disclosing a typical or preferred form of the improvements contemplated herein and in the drawing like reference characters identify the same parts in the several views.

Referring to the drawing, particularly to Figs. 1 and 2, I have illustrated the automatic takeup for the brake bands with which the invention is particularly concerned and designated in its entirety by the numeral 20 as being operatively associated with a conventional brake mechanism designated in its entirety by the letter B, said brake mechanism B being adjunctively employed, for example, to a conventional wheel brake (not shown), or a conventional automotive transmission (not shown), as being adaptable for advantageous employment in a conventional automotive vehicle (not shown).

The illustrated brake mechanism may comprise conventional brake bands 21 and 22 having secured thereto, by any approved practice, friction facing material 23 and 24, respectively, said friction facing material being adaptable to engage a suitable drum 25 upon operation of the device.

In order to urge the brake bands 21 and 22 to their normally inoperative position there is provided the conventional tension spring 26 illustrated as being operatively associated with the brake bands 21 and 22 in a manner to draw said brake bands toward each other a suitable distance, thereby to disengage the friction facings 23 and 24 from the brake drum 25 when the brake mechanism is in released position.

In order to cause the brake bands 23 and 24 to engage the drum 25 there is provided a hydraulic cylinder designated in its entirety by the numeral 30, said hydraulic cylinder being provided with suitable conduits (not shown) adaptable to connect the same with a conventional hydraulic master cylinder (not shown) which in turn is operatively associated with the brake pedal of a conventional automotive vehicle. It is notable that the cylinder 30 is provided with a double acting piston arrangement adaptable to operate in opposed directions. The piston arrangement may comprise a conventional washer 31 suitably formed of flexible material, such as, for example, rubber and illustrated in engagement with a conventional hydraulic piston 32 having operatively associated therewith, a shaft 33 projecting outwardly of said hydraulic cylinder and having end portions operatively associated with portions of the brake band. In order to cause the washer 31 to assume its operative position at all times there is usually provided a compression spring 34 of suitable tension and thickness and disposed between the two washers like 31 disposed in the hydraulic cylinder 30. Although both ends of the cylinder 30 are of similar construction, only one side is broken away to more advantageously show the construction thereof.

Suffice it to say, since the invention is not particularly concerned with the precise construction of the illustrated brake mechanism and/or the general construction of the wheel brakes of an automotive vehicle and/or conventional automotive transmissions with which the brake mechanism may be adjunctively employed and/or their associated parts, they will not be further described in detail, and it is deemed sufficient for all intentions and purposes herein contained to show only portions thereof adjacent to and cooperating with the automatic takeup mechanism 20 contemplated herein. It is to be understood that details of construction of such wheel brake mechanisms and/or automotive transmissions and/or their associated parts may be modified to suit particular conditions, and I do not wish to be limited to the construction of these elements as set forth, except where such construction particularly concerns the invention contemplated herein.

Having thus described, by way of example, a possible adaptation of the automatic takeup mechanism as contemplated herein and having described the general environment surrounding the adaptation, the specific construction and cooperating functions of the parts of said automatic takeup mechanism with which the present invention is particularly concerned, will now be described in detail.

In the exemplary embodiment of the invention depicted in Figs. 1 and 2, the automatic takeup 20 for the brake bands with which the present invention is particularly concerned comprises in general, a hydraulic cylinder 30 operatively disposed between two brake bands 21 and 22 and has suitable pistons such as at 32 operatively disposed therein and adaptable to operate in opposed directions, said pistons respectively having fixedly secured thereto a shaft such as at 33 projecting outwardly of the cylinder and into engagement with the brake band, said hydraulic cylinder 30 being provided with removable end caps 40 and 41 which are advantageously held in operative position by tension springs 42 and 43 of suitable strength and thickness, said caps 40 and 41 being provided with a suitable aperture 44 fitted with a bearing formation adaptable to support the shaft 33 in its movement inwardly and outwardly of the cylinder 30, said caps being provided with a choke spring 50 having the general shape of a washer with slots cut out, in part, from a central aperture towards the outer edge thereof, thereby leaving the free ends of the prongs to protrude and engage the shaft 33, the central aperture of the choke spring being smaller in diameter than the shaft, thereby causing the prongs to cone out with constant pressure against the shaft, whereby the shaft may be forced outwardly during operation of the brakes, but due to the binding action of the prongs with the shaft, inward movement of the shaft 33 is restricted.

Adverting to the drawing, it may be seen that the caps 40 and 41 are disposed in operative position as illustrated and advantageously held in such operative position by the tension springs 42 and 43. This is an important feature of the invention which permits the pistons as at 32 to move outwardly of the cylinder 30 an additional distance after the normal full throw of either or both pistons is reached. This construction and arrangement provides a safety feature which permits the brakes to be engaged even after they have been worn down to capacity and the owner neglects to have the brakes relined. This is advantageously accomplished by permitting the piston 32 to engage the cap 40 and, since the cap 40 is not fixedly secured to the cylinder 30, the cap 40 may be urged outwardly slightly and overcome the resistance of the springs 42 and 43, thereby permitting an additional throw of the piston beyond its normal action.

It is notable that conventional hydraulic brakes would not automatically adjust themselves merely by having the shafts such as at 33 and 33a pass through the choked springs 50 and 51, respectively. In accordance with the construction of the present invention it is necessary to have the choke springs 50 and 51 anchored to the caps 40 and 41, respectively, while the shafts 33 and 33a pass through them. Accordingly, the anchor and brake clearance studs as at 55 are provided. These studs are disposed between the prongs of the choke springs and are provided with a hook means on its outer edge as shown in the drawing. It can be seen that these studs suitably anchor the choke springs to the caps.

It is important that such choke springs must not be anchored tightly to the caps and that there must be sufficient clearance between the heads of the studs and the choke springs, thereby to permit the brake bands 21 to retract slightly from the brake drum upon release of the brakes, such action being necessary to provide proper clearance between the brake bands and the brake drum to prevent the brakes from locking. Preferably the body of the studs 55 is made long enough to permit sufficient clearance between the head of the stud and the choke spring associated with it which permits the choke spring to move outwardly with the shaft 33 or 33a, as the case may be, only a slight distance when the brakes are being operated. When the brakes are subsequently released the shafts 33 and 33a normally are urged inwardly of the cylinder 30, but such movement is restricted by the gripping action of the prongs of the choke springs. As hereinbefore stated, it is desirable to have a slight movement of the shafts inwardly of the cylinder 30 and this is advantageously accomplished by the provision of suitable clearance between the head of the studs and the choke springs which permits sufficient movement of the shafts to release the brakes.

Adverting to the drawing, particularly Fig. 3, it may be observed that the choke springs 50 and 51 are formed of a suitable spring steel to define a washer-like shape having slots cut out, in part, from a central aperture towards the outer edge thereof, thereby leaving the free ends of the prongs to protrude and engage the shafts 33 and 33a and, since the central aperture of the choke springs is smaller in diameter than the shaft, the prongs will cone out and maintain a constant pressure against the shaft. According to the construction and arrangement of parts, the shaft 33 may be easily forced outwardly of the cylinder 30 during operation of the brakes but due to the binding action of the prongs with the shaft, inward movement of the shaft 33 is restricted to only a slight movement facilitated by the clearance between the head of the studs 55 and the choke spring 50.

The operation of the device may be as follows: In order to cause the brake mechanism to operate, the operator will push the conventional brake pedal (not shown) downwardly which will cause hydraulic fluid via suitable connector conduits to enter into the cylinder 30 from a master cylinder (not shown), thereby causing the pistons as at 32 and operatively disposed in the cylinder 30 to move outwardly of said cylinder in opposed directions. This action will cause the facings 23 and 24 carried by the brake bands 21 and 22, respectively, to engage the brake drum 25. When the brakes are subsequently released, the action of the tension spring 26 will urge the friction facings away from the drum 25. It is notable that only a slight clearance between the friction facings and the drum is desirable so that the brakes will be quick-acting. Heretofore, with constructions of the prior art this minimum clearance was not maintained, thereby causing the brakes to become out of adjustment quickly which will make different brake assemblies engage at different times which will cause a swerving of the automotive vehicle to one side or the other when the brakes are applied.

With the construction of the present invention, such desirable minimum clearance is automatically maintained by reason of the provision of the choke springs such as at 50 and 51. These choke springs permit the shafts 33 and 33a to move outwardly of the cylinder 30 when the brakes are operated, thereby to cause the friction facings to engage the brake drum, but when the brakes are subsequently released, movement of the shafts 33 and 33a in an inwardly direction of the cylinder 30 is restricted, and only a slight inward movement of the shafts is permitted by reason of the clearance between the studs 55 of the choke springs, thereby providing at all times the desirable minimum clearance between the friction facings and the brake drums. It is important to note that this construction provides the desirable minimum clearance between the friction facings and the brake drum, and automatically maintains the brakes in proper adjustment.

From the foregoing disclosure, it may be observed that I have provided an automatic takeup for brake bands which efficiently fulfills the objects thereof as hereinbefore set forth and which provides numerous advantages which may be summarized as follows:

1. Structurally simple, efficient and durable;
2. Economical to manufacture and readily adaptable to mass production principles; and
3. The provision of a brake mechanism having incorporated therein, an automatic takeup for the brake bands, said takeup mechanism being adaptable to automatically compensate for the normal wear of the friction facing of the brake band, thereby to automatically maintain the brakes in proper adjustment.

While I have illustrated a preferred embodiment of my invention, many modifications may be made without departing from the spirit of the invention, and I do not wish to be limited to the precise details of construction set forth, but wish to avail myself of all changes within the scope of the appended claims.

I claim:

1. In combination, a hydraulic cylinder having end cap means movable relative to the cylinder, a piston operatively disposed in the cylinder, means arranged to exert a predetermined pressure to move the piston in one direction, and means selectively operable to exert a pressure to move the piston in the opposite direction, and choke spring means secured to the end cap means in a manner so as to permit limited and restricted movement of the choke spring means relative to the end cap means, said choke spring means having portions arranged to cooperate with portions of the piston to permit unrestricted relative movement of the piston in one direction and definitely restricting all movement of the piston relative to the choke spring means when the piston is moved in the opposite direction.

2. A wheel brake comprising a drum, a shoe, fluid actuated motor means including a cylinder and a piston arrangement movably disposed therein and selectively operable for applying the shoe to the drum, and means for releasing the shoe from the drum, cylinder end cap means arranged to move with and in each direction of the piston under certain predetermined conditions whereby the fluid motor means will continue to effectively operate beyond the normal full shoe applying movement, means arranged to hold the cylinder end cap means in its normal operative position and permit relative movement of the end cap means with respect to the cylinder under such conditions, and choke spring means arranged to cooperate with portions of the piston and the cylinder end cap means and arranged to permit substantially unrestricted movement of the piston in its shoe applying movement and limited movement of the piston in the opposite direction.

3. In combination, a hydraulic cylinder having end cap means and a piston reciprocably disposed in the cylinder, choke spring means secured to the end cap means in a manner so as to permit limited and restricted movement of the choke spring means relative to the end cap means, said choke spring means having portions arranged to cooperate with portions of the piston to permit unrestricted relative movement of the piston in one direction and definitely restricting all movement of the piston relative to the choke spring means when the piston is moved in the opposite direction.

4. In combination, a hydraulic cylinder, a piston operatively disposed in the cylinder, means arranged to exert a predetermined pressure to move the piston in one direction, and means selectively operable to exert a pressure to move the piston in the opposite direction, cylinder end cap means arranged to move with and in each direction of the piston under certain predetermined conditions, and choke spring means arranged to cooperate with portions of the piston and the cylinder end cap and arranged to permit unrestricted movement of the piston in one direction and limited movement of the piston in the opposite direction.

5. A wheel brake comprising a drum, a shoe, fluid actuated motor means including a cylinder and a piston arrangement reciprocably disposed therein and selectively operable for applying the shoe to the drum, and means for releasing the shoe from the drum, cylinder end cap means arranged to move with and in each direction of the piston under certain predetermined conditions whereby the fluid motor means will continue to effectively operate beyond the normal full shoe applying movement, and means arranged to hold the cylinder end cap means in its normal operative position and permit relative movement of the end cap means with respect to the cylinder under such conditions.

6. In a wheel brake comprising a drum, a shoe, fluid actuated motor means including a cylinder and a piston arrangement movably disposed therein and selectively operable for applying the shoe to the drum, and means for releasing the shoe from the drum, the combination of cylinder end cap means arranged to move with and in each direction of the piston under certain predetermined conditions whereby the fluid motor means will continue to effectively operate beyond the normal full shoe applying movement, means arranged to hold the cylinder end cap means in its normal operative position and permit relative movement of the end cap means with respect to the cylinder under such conditions, and choke spring means arranged to cooperate with portions of the piston and the cylinder end cap means and arranged to permit substantially unrestricted movement of the piston in its shoe applying movement and limiting movement of the piston in the opposite direction.

JOSEPH L. SLATIN.

REFERENCES CITED

The following references are of record in the file of this patent:

UNITED STATES PATENTS

| Number | Name | Date |
| --- | --- | --- |
| 1,755,829 | Longhead | Apr. 22, 1930 |